(12) United States Patent
Casalaina

(10) Patent No.: US 7,406,514 B2
(45) Date of Patent: *Jul. 29, 2008

(54) DELTA CACHING

(75) Inventor: Marc C. Casalaina, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/387,193

(22) Filed: Mar. 22, 2006

(65) Prior Publication Data

US 2006/0168348 A1 Jul. 27, 2006

Related U.S. Application Data

(63) Continuation of application No. 09/615,383, filed on Jul. 13, 2000, now Pat. No. 7,058,700.

(51) Int. Cl.
*G06F 15/177* (2006.01)

(52) U.S. Cl. ............... 709/220; 709/221; 709/203

(58) Field of Classification Search ......... 709/220–221, 709/203, 217–219, 246

See application file for complete search history.

(56) References Cited

U.S. PATENT DOCUMENTS

| | | | |
|---|---|---|---|
| 5,740,430 A | 4/1998 | Rosenberg et al. | |
| 5,870,544 A | 2/1999 | Curtis | |
| 5,873,069 A | 2/1999 | Reuhl et al. | |
| 5,894,554 A | 4/1999 | Lowery et al. | |
| 5,945,989 A | 8/1999 | Freishtat et al. | |
| 6,052,730 A | 4/2000 | Felciano et al. | |
| 6,092,074 A | 7/2000 | Rodkin et al. | |
| 6,105,004 A | 8/2000 | Halperin et al. | |
| 6,112,242 A * | 8/2000 | Jois et al. | 709/225 |
| 6,122,661 A | 9/2000 | Stedman et al. | |
| 6,185,608 B1 * | 2/2001 | Hon et al. | 707/10 |
| 6,192,398 B1 | 2/2001 | Hunt | |

(Continued)

OTHER PUBLICATIONS

Banga et al, "Optimistic Deltas for WWW Latency Reduction," in Proc. 1997 USENIX Technical Conf., pp. 289-303, Anaheim, CA, Jan. 1997.*

(Continued)

*Primary Examiner*—Philip B Tran
(74) *Attorney, Agent, or Firm*—Townsend and Townsend and Crew

(57) ABSTRACT

A solution to latencies associated with server side processing time, as well as to latency resulting from the transit of information or tools from a server side to a client or user side is provided. The server side and client side can be coupled via a hard link or a network-type connection such as the Internet or a local area network. Select delta page information is stored in a concise manner on client side. As a result, the client does not have to contact the server when a user requests page information that is associated with stored delta page information. The stored delta page information can be accessed and used to update the current page thereby yielding the requested page. Thus, latency from server side processing and network transit time is reduced. An algorithm can be implemented on the client side to identify relevant stored delta page information, and to update the current page with that delta page information.

25 Claims, 4 Drawing Sheets

U.S. PATENT DOCUMENTS

| | | | |
|---|---|---|---|
| 6,226,792 B1 | 5/2001 | Goiffon et al. | |
| 6,238,246 B1 | 5/2001 | Ferrill et al. | |
| 6,253,216 B1 | 6/2001 | Sutcliffe et al. | |
| 6,253,234 B1* | 6/2001 | Hunt et al. | 715/511 |
| 6,263,352 B1 | 7/2001 | Cohen | |
| 6,266,684 B1 | 7/2001 | Kraus et al. | |
| 6,308,275 B1 | 10/2001 | Vaswani | |
| 6,317,761 B1 | 11/2001 | Landsman et al. | |
| 6,366,933 B1* | 4/2002 | Ball et al. | 715/511 |
| 6,415,319 B1 | 7/2002 | Ambroziak | |
| 6,434,578 B1 | 8/2002 | McCauley et al. | |
| 6,438,578 B1 | 8/2002 | Schmid et al. | |
| 6,442,601 B1 | 8/2002 | Gampper et al. | |
| 6,457,030 B1 | 9/2002 | Adams et al. | |
| 6,457,047 B1 | 9/2002 | Chandra et al. | |
| 6,493,679 B1 | 12/2002 | Rappaport et al. | |
| 6,493,742 B1 | 12/2002 | Holland et al. | |
| 6,507,854 B1* | 1/2003 | Dunsmoir et al. | 715/501.1 |
| 6,560,639 B1* | 5/2003 | Dan et al. | 709/219 |
| 6,594,691 B1 | 7/2003 | McCollum et al. | |
| 6,601,057 B1 | 7/2003 | Underwood et al. | |
| 6,658,464 B2* | 12/2003 | Reisman | 709/219 |
| 6,668,354 B1 | 12/2003 | Chen et al. | |
| 6,687,816 B1* | 2/2004 | Frayman et al. | 713/1 |
| 6,728,769 B1* | 4/2004 | Hoffmann | 709/225 |
| 6,760,750 B1 | 7/2004 | Boneh et al. | |
| 7,058,700 B1* | 6/2006 | Casalaina | 709/220 |
| 7,082,454 B1* | 7/2006 | Gheith | 707/10 |
| 7,096,418 B1* | 8/2006 | Singhal et al. | 715/501.1 |

OTHER PUBLICATIONS

Banga et al, "Optimistic Deltas for WWW Latency Reduction",In Proc. 1997 USENIX Technical Conf., pp. 289-303, Anaheim, CA, Jan. 1997.

Baron, et al. "Techniques for Creating and Using Web Questionaires in Research and Teaching," in Psychological Experiments on the Internet (M. H. Birnbaum (Ed.)(2000), downloaded from <http://www.psych.upenn.edu/.about.baron/examples/baron4.htm>.

Beilby, James, "Re: Help me I'm dumb" in comp.lang.javascript, Sep. 18, 1999, downloaded from <http://groups.google.com/group/comp.lang/javascript/msg/8e7c1ab6c5868- e48?hl=en&>.

Blake et al, "Delta Service in a Moblie File System Client Cache", IEEE, 1998.

Broderick, Andrew, "Re: Sub Drop Down List," in microsoft.public.vinterdev, Jul. 1, 1998, downloaded from <http://groups.google.com/group/microsoft.public.vinterdev/msg/74b1b9- fafd6e9f89?hl=en&>.

Camden, Ray, "Creating a 'Live' ColdFusion Site" ColdfFusion Developer's Journal, Jan. 12, 1999, downloaded from <http://cfdj.sys-con.com/read/41481.htm>.

Freedman, Richard, "Re: Passing complex structure (binary tree) from java to javascript," in comp.lang.javascript. Apr. 16, 1998, downloaded from <http://groups.google.com/group/comp.lang.javascript/msg/84988957fc822-ec5?hl=en&>.

Greenwood, Tony, "Re: Help! Passing vars between Perl and JavaScript," in comp.lang.javascript, May 18, 1999, downloaded from " http://groups.google.com/group/comp.lang.javascrpit/msg/d6d6e18ddd89b282- ?hl=en&".

Greenwood, Tony, "Re: receiving parameters," in comp.lang.javascript, Mar. 22, 1999, downloaded from <http://groups.google.com/group/comp.lang.javascript/msg/88b9dd5f7502e- 0d?hl=en&>.

Greeson, Roy et al., "Is this possible with Client-Side Java?" in comp.lang.javascript, Mar. 20, 1999, downloaded from <http://groups.google.com/group/comp.lang.javascript/browse.sub.—thread/thread/3788f12a16af547f/2446b8a8bd23e1aa#2446b8a8bd23e1aa>.

Honnen, Martin, "Re: JavaScript polling a servlet/cgi," in borland.public.intrabuilder.javascript, Oct. 9, 1998, downloaded from <http://groups.google.com/group/borland.public.intrabuilder..javascrip- t/msg/4b70e4bc473fc93a?hl=en&>.

Jalix.Org, "The Dynamic Duo--Cross-Browser Dynamic HTML," Nov. 11, 1999 downloaded from <http://www.jalix.org/ressources/internet/dhtml/.sub.--dynduo/dynduo-1- 9991024.pdf>.

Jenks, Ken, "Submitting all forms within a HTML-page?" in comp.lang.javascript, Nov. 22, 1999, downloaded from <http://groups.google.com/group/comp.lang.javascript/msg/d4654b5ac56a4-2b2?hl=en&>.

Jenks, Ken, "Re: JavaScript Calling CGI Script," in comp.lang.javascript, Feb. 16, 2000, downloaded from <http://groups.google.com/group/comp.lang.javascript/msg/343ea4daa298e- df?hl=en&>.

Jenks, Ken, "Re: Can you call a Java Servlet through javascript?" in comp.lang.javascript, Jan. 6, 2000, downloaded from <http://groups.google.com/group/comp.lang.javascript/msg/249ef5feb780b-97e?hl=en&>.

Newton, Stuart, "Re: Problem on variables--Need your help!" in microsoft.public.inetserver.iis.activeserverpages, Jan. 12, 2000, downloaded from <http://groups.google.com/group/microsoft.public.inetserver.iis.active-serverpages/msg/45daf823b1585941?hl=en&>.

Payne, Patrick, "Re: Web Development--the future or a sideline?" in comp.lang.javascript, Aug. 23, 1999, downloaded from <http://groups.google.com/group/comp.databases.pick/msg/e55f8bb165bbe3- 6?hl=en&>.

Quantz, Larry, "need help with 'merging' two html files together", in.comp.lang.javascript, Feb. 6, 2000, downloaded from <http://groups.google.com/group/comp.lang.javascript/msg/1f890780cb6c2- 2e6?hl=en&>.

Schwartz, "Chapter 20--VBScript Forms, Controls, and Managing Transactions," Special Edition Using Visual Basic Script, QUE Corporation, 1996, downloaded from <http://www.urc.bl.ac.yu/manuals/vbscript/ch20fi.htm.>.

Segura, Alvaro, Re: Client JScript talking to Server, in comp.lang.javascript, Mar. 18, 1999 downloaded from <http://groups.google.com/group/comp.lang.javascript/msg/0afe1f53f594a- alb?hl=&>.

Sigiros, Angelo, "Re: passing data: frame1>server>frame2 how???" in netscape.devs-javascript, Jan. 8, 1999, downloaded from <http://groups.google.com/group/netscape.devs-javascript/msg/921acdc6f-9d30ce4?hl=en&>.

Storms, Ian A., "Re: Connecting to Database!!!" in comp.lang.javascript, Aug. 17, 1999, downloaded from <http://groups.google.com/group/comp.lang.javascript/msg/5536270d89075- 0fc?hl=en&>.

Storms, Ian a., "Re: the efficiency of Javascript Variables," in comp.lang.javascript, Jan. 25, 1999, downloaded from <http://groups.google.com/group/comp.lang.javascript/msg/5912db735c768-5e8?hl=&>.

Valley, Thomas, "Re: Opening a URL in the background," in netscape.devs-javascript, Mar. 19, 1998, downloaded from <http://groups.google.com/group/netscape.devs-javascript/msg/72126c9d8- cc41723?hl=&>.

Wilkinson, Bill, "Re:Response Redirect," in Microsoft.public.inetserver.asp.general, Feb. 3, 2000, downloaded from <http://groups.google.com/group/microsoft.public.inetserver.asp.genera-l/msg/8dd026d00167fd14?hl=en&>.

Zandstra, Matt, "Re: passing variables," in comp.lang.javascript, Aug. 12, 1998, downloaded from <http://groups.google.com/group/comp.lang.javascript/msg/c8f282bf26253- 8864?hl=en&>.

Zigray, David, "Web Development-- the future or a sideline?-- NOW!" in comp.database.pick, Aug. 25, 1999, downloaded from <http://groups.google.com/group/comp.databases.pick/msg/772b10140e56fe- 47?hl=en&>.

Remote Scripting, "http://msdn.microsoft.com/scripting/remotescripting . . . " Microsoft Corporation (Jan. 4, 2000).

* cited by examiner

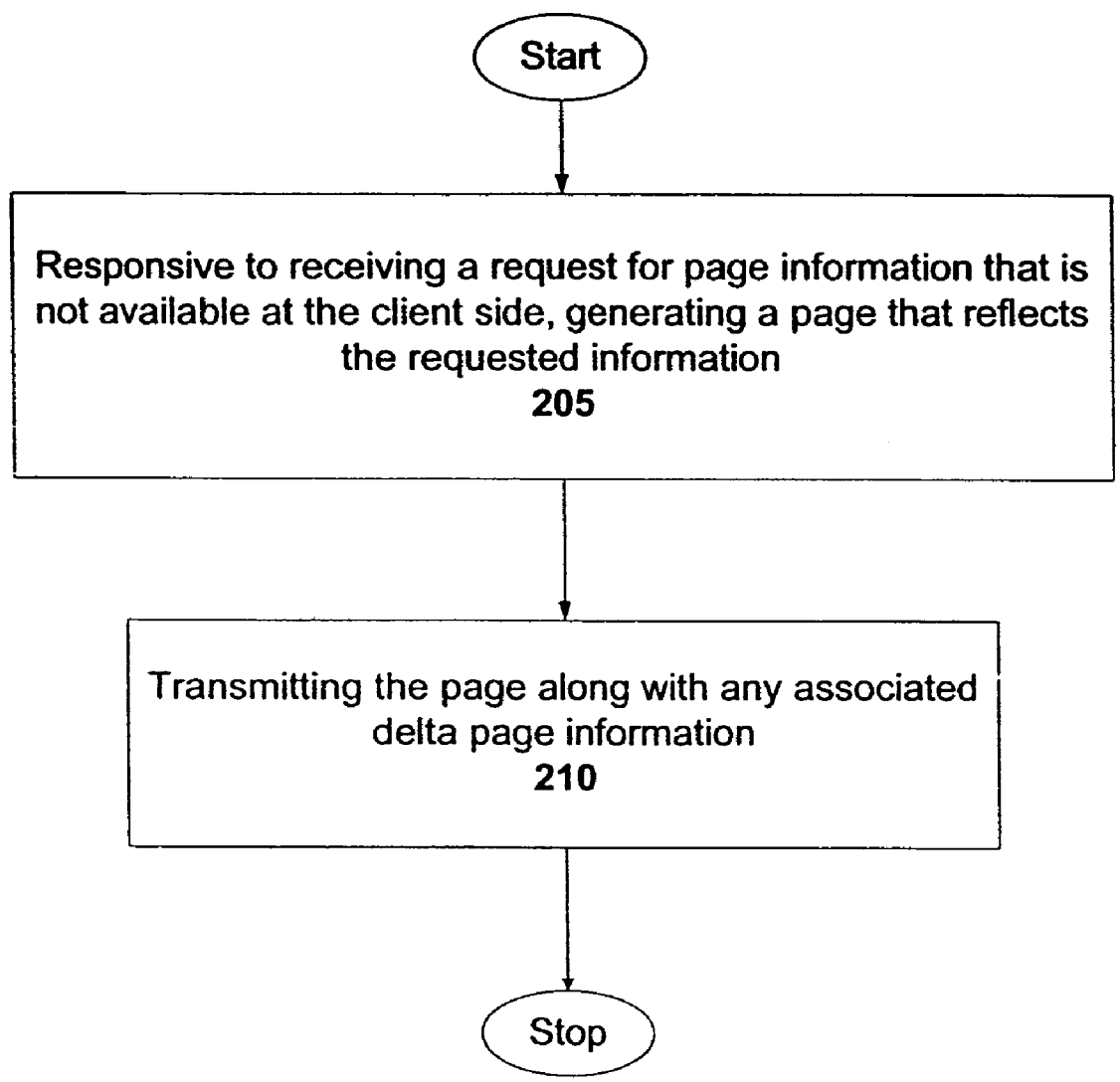

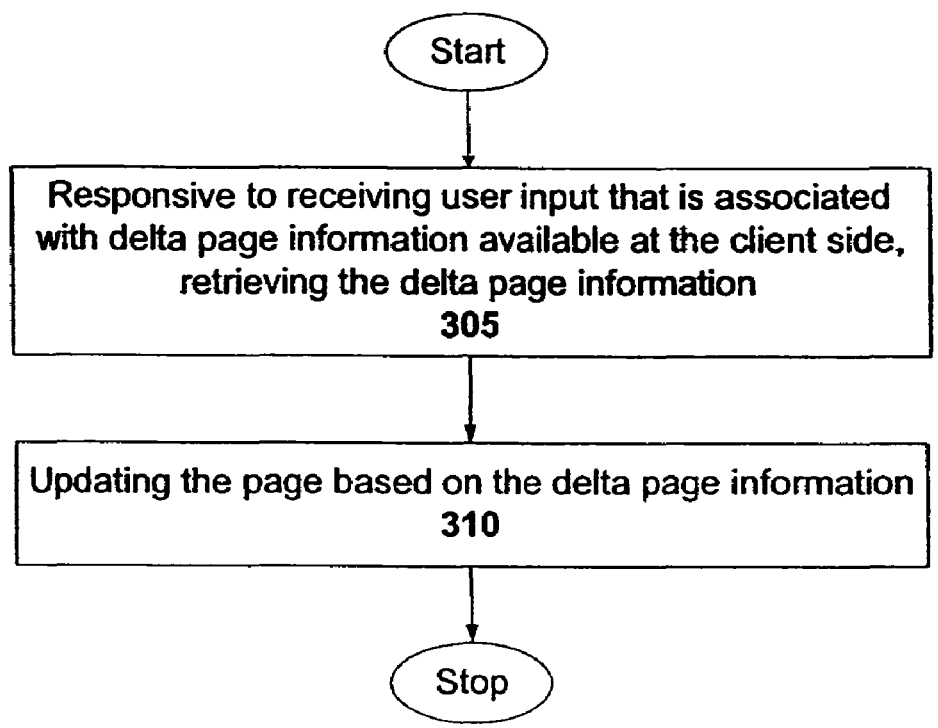
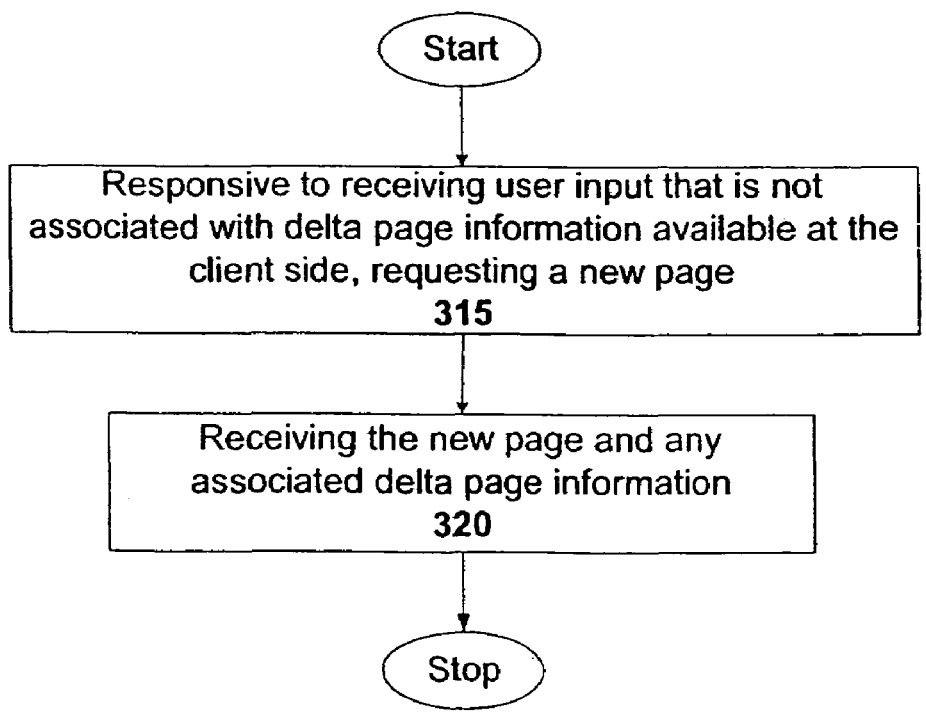

Fig. 4
| User Input | Delta Page Information |
|---|---|
| A | 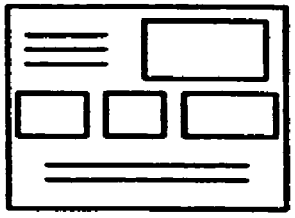 |
| B | 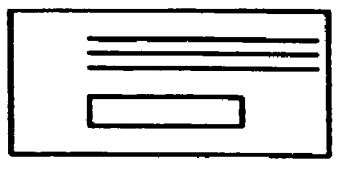 Conflict Explanation |
| C | Conflict Explanation |
| D | Configuration Engine Results |
| E | Audio Signal |
| F | Braille Information |

DELTA CACHING

CROSS-REFERENCES TO RELATED APPLICATIONS

The present application claims the benefit of earlier filed non-provisional application U.S. Ser. No. 09/615,383, entitled DELTA CACHING, filed Jul. 13, 2000, the entire content of which is incorporated herein by reference.

BACKGROUND OF THE INVENTION

1. Field of the Invention

This invention relates to the exchanging of information over a network such as the Internet and more specifically, to the caching of select document information on the client side of a client-server system thereby improving the efficiency and response time of the system.

2. Description of the Related Art

There are numerous applications where a client side user interface (UI) obtains a document from a server over a network. One such application involves a product configuration that is performed over the Internet using a method whereby a client browser obtains a document from a server. This document may, for example, be a web page that contains selectable features of a product. A user can make changes to the document on the client browser by selecting various product features and providing other configuration information. The altered document resulting from this interaction is then submitted to the server where the information provided by the user is processed. Such processing can, for example, produce configuration results that are responsive to the user provided information. After the server has finished processing the provided information, it sends the client a new document that embodies the configuration results. This exchange of documents between the server and client browser can be repeated until the product configuration is complete.

There are various latency problems associated with this type of on-line configuration process. For example, the user experiences the latency involved in server processing. Such processing typically involves accessing a configuration engine that determines any incompatibilities or constraints arising from the selection of certain product features by the user. Additionally, the user experiences the latency associated with the time expended while the document is in transit between the server and the client browser (e.g., network latency). Depending on factors such as the complexity of the product being configured and the number of other users attempting to access the server or configuration engine, the latency attributed to server processing time and transit time can be significant.

One solution offered to alleviate latency associated with server processing time is to cache the configuration results of the most often-selected configuration states on the server side. The document embodying the configuration results of the most often-selected configuration states can also be cached on the server side. Thus, if the user submits a document that reflects a configuration state that is associated with configuration results or a document that the server has stored, then the server does not need to process the user provided document (e.g., the configuration engine does not need to be accessed to generate the configuration results). Rather, the server can send out the stored configuration results or document that reflects those configuration results. However, this solution still suffers from latency resulting from the transit of information from the server to the client browser, whether that information is a document or configuration results.

Another solution offered to alleviate latency involves transferring server side tools (e.g., a configuration engine) to the client side, thereby reducing latency associated with server processing. This solution, however, introduces considerable latency involved in transferring such tools to the client, not to mention that it is infeasible to perform complex configurations using client-side tools. Moreover, what was once a server side latency problem is now a client side latency problem. Additionally, tools such as configuration engines involve a great deal of calculation, and are therefore best implemented on a high performance machine. As such, a user having a lower-end machine may experience excessive delays using such a client side engine.

What is needed, therefore, is a technique that provides a solution to latency associated with server side processing time (e.g., configuration engine processing time), as well as to latency resulting from the transit of information or tools from the server side to the client side.

BRIEF SUMMARY OF THE INVENTION

Techniques described here provide a solution to latency associated with server side processing time, as well as to latency resulting from the transit of information or tools from a server side to a client side. The server side and client side can be coupled, for example, via a hard link or a network-type connection such as the Internet or a local area network. Although the following description provides examples in the context of product configuration over the Internet, these techniques can be employed in any client-server environment where it is desirable to decrease latency associated with server processing time and or the transit of information from the server side to the client side.

In the context of a product configuration over the Internet, select and preprocessed configuration results are stored on the client side machine instead of on the server-side machine. In one embodiment, these preprocessed configuration results are represented by graphical and textual delta page information that defines the difference between a current page and a next page based on a particular user input. This delta page information is embedded in the current page (e.g., the page that is initially presented to the client side browser). As such, the client side browser does not have to contact the server side when the particular user input that is associated with preprocessed configuration results (e.g., delta page information) is provided. Rather, the client side browser can use the delta page information embedded or cached within the current page to update that page thereby yielding the requested next page. Thus, latency from server side processing and network transit time is reduced. An algorithm can be used to implement a client side caching and updating mechanism. Such an algorithm can be implemented on a client side machine without requiring the high-end performance expected of a server-side machine. As such, even clients with low-end machines will experience very little delay when using the described technique.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2 is a flow diagram illustrating a method for transmitting page information generated on a server side to a client side in accordance with one embodiment of the present invention.

FIG. 3a is a flow diagram illustrating a method for updating client side page information in accordance with one embodiment of the present invention.

FIG. 3b is a flow diagram illustrating a method for receiving page information on a client side in accordance with one embodiment of the present invention.

FIG. 4 is a pictorial representation of delta page information stored in a memory in accordance with one embodiment of the present invention.

DETAILED DESCRIPTION OF THE PREFERRED EMBODIMENTS

Figure 1:
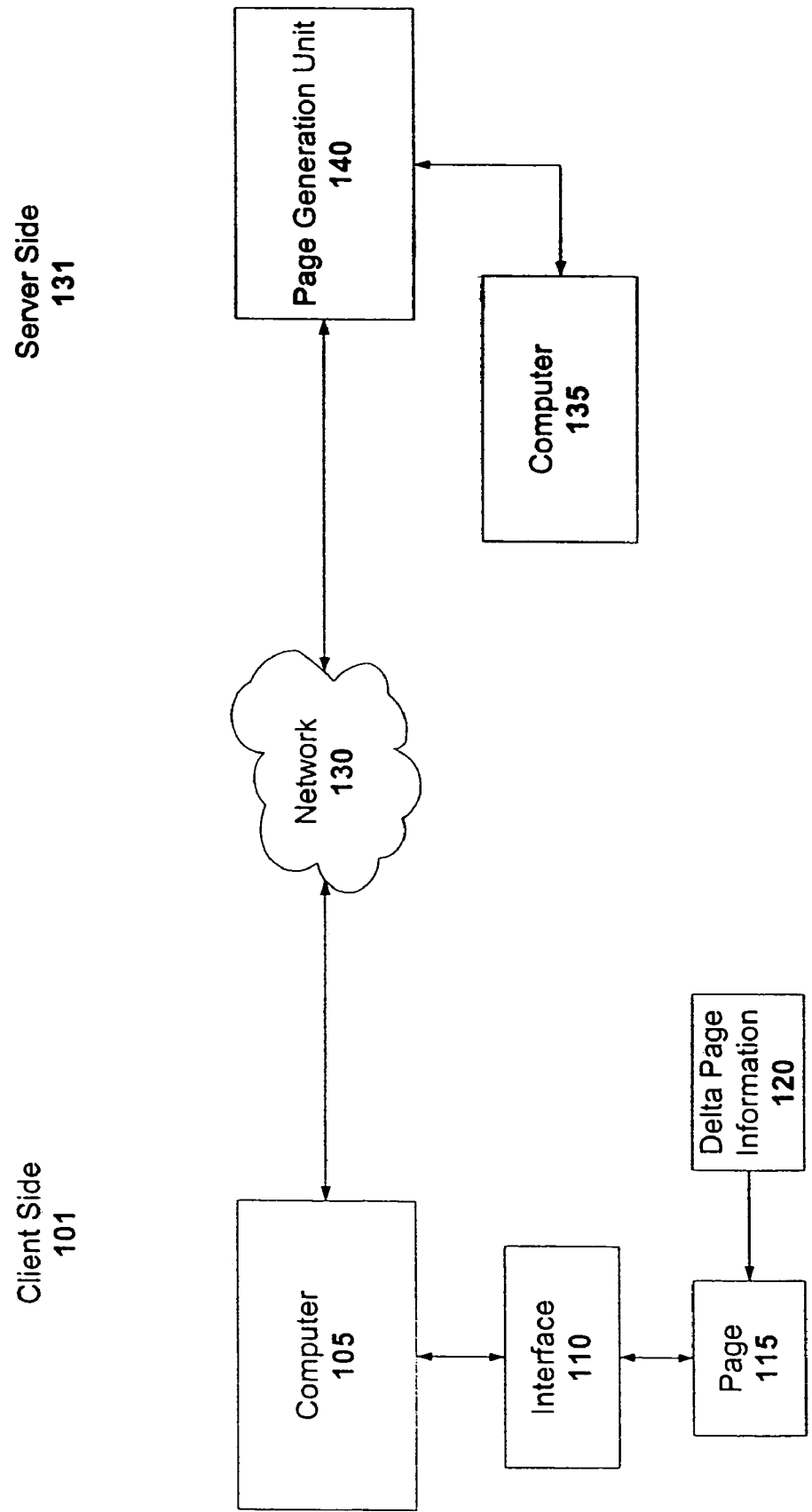
FIG. 1 is a block diagram of a system for communicating page information over a network where delta page information is associated with a requested page in accordance with one embodiment of the present invention.

FIG. 1 is a block diagram of a system for communicating page information over a network where delta page information is associated with a requested page in accordance with one embodiment of the present invention. The system includes a client side 101 and a server side 131 coupled together by a network 130. Network 130 can be a local area network (e.g., intra-office network) or a wide area network (e.g., inter-office network or the Internet). Alternatively, network 130 can be a hard link, or any other type of communication path that allows one computer to communicate with another computer (e.g., a wireless communication link).

Client side 101 comprises a computer 105 and an interface 110 that is operatively coupled to computer 105. A page 115 is presented to a user via interface 110. Associated with page 115 is delta page information 120. Server side 131 comprises a computer 135 and a page generation unit 140. Server side 131 may also include various other tools. For instance, in the context of a product configuration that is performed over the Internet, server side 131 might also include a configuration engine coupled to (or included in) computer 135. In one example embodiment, server side 131 can be representative of an Internet-based service provider, such as a virtual computer store that allows a user to configure and purchase a customized computer system on-line. In such an embodiment, client side 101 might be representative of a user's home or office computer system that is interacting with server side 131 via an Internet connection. In another example embodiment, server side 131 might be representative of an application server, and client side 101 might be representative of a workstation or other personal computing environment.

Computer 105 can be representative of any one of a number of computing environments. For example, computer 105 might be a home personal computer, an office workstation, a laptop, or an embedded microcontroller coupled to a use interface. Likewise, computer 105 might be a personal digital assistant or a cell phone that is capable of receiving communications and displaying them to a user so that the user can respond accordingly. In general, computer 105 can be any processing environment that allows for user interaction based on received communications.

Interface 110 allows a user to interact with the system and can be, for example, a browser or graphical user interface (GUI) that is displayed to a user via a display such as a monitor, flat panel display or LED display. Alternatively, interface 110 might be a mechanism that translates incoming communications into, for example, sounds or a Braille communication so that a visually impaired user could understand and respond to the communication. Page 115 can be presented to the user by interface 110. Page 115 can include visual communication such as controls (e.g., edit or list boxes), configurable product information, and text. Alternatively, page 115 can include non-visual communication (e.g., an audible or Braille communication). In general, page 115 can include any type of information (e.g., textual, graphical, physical, or audible) that informs the user. The user can then provide input to the system based on page 115.

Delta page information 120 represents the differences between page 115 and various pages that can be displayed to the user next based on user input. For example, assume for discussion purposes that page 115 provides the user with a pull-down or list box that allows the user to choose one of three possible choices: A, B or C. In the context of a non-visual communication, page 115 might provide the user with a Braille message allowing for similar choices. Upon providing a user input (e.g., choosing A and submitting that choice), the user is then presented with a new page that reflects that choice. In some cases, changes in page 115 triggered by a particular user input only affect a portion of page 115. However, such a user input may affect all of page 115 (e.g., user input requires a completely new page). Regardless, the changes triggered by user input represent the difference between page 115 and the page that reflects page 115 plus the user input (also referred to as the next page). Such changes comprise delta page information 120.

For example, if choice A is selected and submitted, page 115 will be updated to reflect that choice. The changes to the page resulting from that update represent the difference between page 115 and the page that reflects page 115 plus choice A. Likewise, if the user chooses and submits choice B, the resulting changes represent the difference between page 115 and the page that reflects page 115 plus choice B, and if the user chooses choice C, the resulting changes represent the difference between page 115 and the page that reflects page 115 plus choice C. One skilled in the art will recognize that the differences between page 115 and the next page can also be the result of any number of choices made by the user (e.g., 20 choices made on 20 different pull-down or list boxes) on page 115.

In one embodiment, delta page information 120 is included in a table that is embedded in page 115. The table is transmitted along with page 115 from server side 131 to client side 101, and is hidden from the user. The table contains the delta page information, relevant to page 115, resulting from certain user inputs (e.g., the five most commonly selected user inputs). Each such user input corresponds to a change or set of changes to page 115. Each change or set of changes is stored in the table and can be indexed by the user input that triggered those particular changes. As such, once a user input is provided, it can be compared to the user inputs listed in the table. If a match is found, then the changes associated with that input can be retrieved from the table and used to update page 115 thereby producing a new page that is responsive to the provided user input. As such, server side 131 does not need to be contacted, nor does server side 131 need to generate and transmit the new page.

In another embodiment, delta page information 120 is externally coupled to page 115. For example, delta page information 120 can be a data file that is transmitted along with page 115. Responsive to receiving a user input, the data file can be parsed to determine if that user input is stored therein. If a match is found, then delta page information associated with that user input can be retrieved from the data file and used to update page 115 thereby producing a new page that is responsive to the provided user input. Other schemes can be implemented to ensure that selected delta page information is provided to client side 101 along with page 115. Regardless of the scheme used, the end result is the same: if a user input received on the client side is found in delta page information 120, then server side 131 does not need to be contacted, nor does server side 131 need to generate and transmit the new page.

Once it is determined that delta page information 120 includes changes to page 115 necessitated by user input, a process running on client side 101 can be used to update page 115 with those changes. In one embodiment, this process is transmitted to the client side independent of transmitted page information. Alternatively, this process is transmitted to the client side along with transmitted page information (e.g., embedded in page 115). Regardless of how or when client side receives this process, it is used for updating page 115. Such a process can be implemented, for example, in a web browser scripting language (e.g., JavaScript or VBScript) or other program language that allows interface 110 to update page 115 using Dynamic HTML with the related delta page information 120. Once such a process is transmitted and received, a flag can be set to indicate that client side 101 has received the process. As such, the process need only be sent once from server side 131 during a particular on-line session.

On server side 131, computer 135 can be representative of any conventional processing environment. For example, computer 135 may be a server, a workstation or a microcontroller. Page generation unit 140 is used to generate page 115 in response to user input provided on client side 101. This page 115 may be an entire page (e.g., a web page or a UI page). Alternatively, this page 115 can be a portion of a page. As explained above, page 115 can be associated with delta page information 120 that reflects the difference between page 115 and a next page that is responsive to user input submitted from that page 115. However, not all pages 115 generated by page generation unit 140 need to be associated with delta page information 120. Moreover, each page 115 generated by page generation unit 140 can be associated with delta page information 120 that is unique to that particular page 115. On the other hand, two different pages 115 generated by page generation unit 140 can each be associated with the same delta page information 120. For example, if a first page reflects configuration state A and a second page also reflects configuration state A, then both those pages can be associated with the same delta page information 120. Whether delta page information 120 exists for a particular page 115, or is shared by various pages 115 is dependent upon, for example, the application and the user inputs provided.

Data that is used to determine what next pages (relevant to page 115) should be preprocessed can be collected, analyzed and stored on server side 131. The term "preprocessed page" is used to describe a next page that can be obtained by combining the current page 115 with some amount of delta page information 120 that is associated with that current page 115. Factors such as how often a particular next page is selected from a page 115, as well as new advertising campaigns encouraging the use of a particular next page (relevant to page 115), can be used to determine what next pages should be preprocessed. Other factors and data points that are predictive of user behavior relevant to a particular page 115 can be used in determining what next pages should be preprocessed.

Once it is determined that a particular next page should be preprocessed, the information that defines the difference of that next page relevant to the preceding page can be stored on server side 131 (e.g., in a memory coupled to computer 135). Such stored difference information can exist for a number of page-pair combinations. For example, a first page-pair combination might be A-B, where the difference information between page A and page B is a pull-down list and some informational text; a second page-pair combination might be A-C, where the difference information between page A and page C is a banner ad or other advertisement; a third page-pair combination might be B-E, where the difference information between page B and page E is a Braille message; and a fourth page-pair combination might be C-E, where the difference information between page C and page E is an audible tone having a distinct pitch. The stored difference information can be organized to facilitate its access. For instance, each set of difference information can be indexed according to its associated user input. Alternatively, each set of difference information can be indexed according to its associated page-pair combination. Other indexing schemes can be used as well.

In one embodiment, page generation unit 140 accesses the stored difference information relevant to the page being generated and embeds that difference information in the page (e.g., in a look-up table) so as to provide delta page information 120 with the generated page. In another embodiment, computer 135 accesses the stored difference information relevant to the page being generated by page generation unit 140, and that difference information is transmitted externally to the page (e.g., in a data file) thereby providing delta page information 120. Other methods for associating the relevant stored difference information with the corresponding page on server side 131 can be used to achieve the same functional result: delta page information 120 is transmitted along the generated page.

The embodiment shown in FIG. 1 is offered to facilitate discussion and is not intended to limit the present invention. Those skilled in the art will recognize that numerous other system configurations can be employed in accordance with this disclosure. Additionally, the user that is interacting with the system may be a human or a machine capable of interacting with the system (e.g., another computer system). Furthermore, a user input may be representative of a single user input or a set or accumulation of user inputs (e.g., such as a configuration state of a configurable product).

FIG. 2 is a flow diagram illustrating a method for transmitting page information generated on a server side to a client side in accordance with one embodiment of the present invention. The method includes, responsive to receiving a request for page information that is not available at the client side, generating 205 a page that reflects the requested information. For discussion purposes, assume that a user on the client side has selected various features of a configurable product and has submitted the selected features. Further, assume that the product features selected require page information that is not available on the client side. The server side will therefore receive a request for a new page that reflects the user input provided (e.g., the selected product features). The server may engage a configuration engine to compute a new configuration state based on those selected product features. A page that reflects the new configuration state can then be generated.

The method further includes transmitting 210 the page along with any associated delta page information. This delta page information can, for example, be delta configuration information wherein such information defines the differences (e.g., graphical and textual) between the transmitted page and various next pages. Such next pages can be selected, for instance, based on the frequency of those next pages having been requested in the past. The delta configuration information can be indexed, for instance, according to the corresponding input that would trigger a need for such information. Transmitting this delta configuration information to the client side along with an initially requested configuration page reduces the need to access the server side configuration engine and eliminates the need to transmit new page data from the server side. Thus, latency associated with such server side actions is reduced.

FIG. 3a is a flow diagram illustrating a method for updating client side page information in accordance with one embodiment of the present invention. The method includes, responsive to receiving user input that is associated with delta page information available at the client side, retrieving 305 that delta page information. For example, in the context of an on-line product configuration, commonly requested configuration states can be stored inside a client side web page that was transmitted from a server side in accordance with one embodiment of the present invention. Such a web page contains, for example, configuration data presented to the user in the form of controls (e.g., edit boxes and list boxes). As such, commonly requested configuration states can be stored in terms of control deltas, which are bits of information that indicate the difference between a control in its present state and the same control in a new state based on received user input. Other delta-type page information can be stored as well (e.g., textual, graphical, physical, audible information). Such stored information is organized so that it can be timely retrieved. In one embodiment, for example, the information is stored and indexed in a look-up table. Once a user input is received, the table can be parsed to determine if that particular user input is stored in the table and therefore preprocessed. If so, the delta page information (e.g., control deltas) corresponding to that input can be retrieved from the table.

Once it is determined that the user input provided corresponds to stored delta page information and that information is retrieved, the method continues with updating 310 the page based on the delta page information. Continuing with the on-line product configuration example, the client browser can create the new page with the retrieved delta page information (e.g., control deltas). For example, the new page might include the new state of each control on the page affected by the user input. In one embodiment, the client browser can update the page based on the retrieved delta page information by using a web browser scripting language program transmitted with the page. For example, the retrieved delta page information can be layered into the page via a JavaScript code and Dynamic HTML. Alternatively, a program embedded in the client application or program can accomplish such updating.

FIG. 3b is a flow diagram illustrating a method for receiving page information on a client side in accordance with one embodiment of the present invention. The method includes, responsive to receiving user input that is not associated with delta page information available at the client side, requesting 315 a new page. For example, a page generation unit on the server side could be contacted to produce a new page that is responsive to the user input received on the client side. The method further includes receiving 320 the new page and any associated delta page information. This delta page information might, for example, represent the difference (e.g., textual, graphical, physical, audible information) between the newly generated page and any one of a number of next pages commonly requested from that new page. As such, if one of those commonly requested pages is selected next, then steps 305 and 310 of FIG. 3a can be carried out thereby reducing latency associated with server side processing time and transmission time.

FIG. 4 is a pictorial representation of delta page information stored in a memory in accordance with one embodiment of the present invention. In this example, delta page information is indexed in a look-up table according to the corresponding user input. Assume that this table is embedded in a current page being presented to a user via an interface such as a client browser or UI. The four user inputs (A, B, C, and D) shown in the table might be the most commonly selected configuration states from the current page. Any of these four user inputs can represent a single user input (e.g., the first selected feature of a configurable product). On the other hand, any of these four user inputs can represent an accumulation of user inputs (e.g., a configuration state of a configurable product).

Each of the user inputs stored in the table is related to delta page information. This delta page information represents the difference between the current page and the next page requested based on the related user input. As such, this delta page information can be used to create that next page without having to access a server side page generation unit. In the context of a product configuration environment, nor will a configuration engine (whether on the client side or the server side) have to be accessed. In the example shown, user input A is related to two different portions of delta page information. Each portion may comprise, for example, textual and graphical information that is responsive to user input A. Such delta configuration page information may embody preprocessed configuration engine computations that are responsive to user input A. User input B is also related to two different portions of delta page information. The first portion is graphical in nature (e.g., a control such as a pull down list), while the second portion is a textual conflict explanation that is responsive the user input B. The delta page information related to user input C is a textual conflict explanation that is responsive the user input C. User input D is related to configuration engine computations. Such computations define constraints and incompatibilities associated with user input D (e.g., a selected configuration state). Storing these computations on the client side might be desirable, for example, in an application where the client side has access to a local page generation unit for generating a page that represents the stored configuration engine computations.

Other types of delta page information can be stored as well. For example, user input E is related to audio signal information. User input F, on the other hand, is related to Braille information. For example, the delta page information associated with input E could be a digital data file that, when applied to an audio system (e.g., a sound card of an interactive personal computer system), produces a tone, pitch or melody having a communicative meaning that is responsive to user input E. Likewise, the delta page information associated with input F could be a digital data file that, when applied to a Braille machine (e.g., a Braille writer), produces a Braille message responsive to user input F. Such non-visual delta page information can be used to replace the current page being presented to the user, or can be used to update the current page so that the resulting page is a hybrid of the current page and the delta page information, just as can be done with visual delta page information.

Once a user provides an input, that input can be compared to the user inputs stored in the table. Upon finding a match, the related delta page information can then be retrieved and used to update the current page. The process of comparing the user input to the user inputs listed in memory, and updating the initial page with the delta page information thereby creating the requested next page can be accomplished by a program or algorithm. Such a program can be, for example, embedded in the initial page transmitted from the server side (e.g., a web browser scripting language program using Dynamic HTML), or it can be embedded in a client-based program (e.g., a $C^{++}$ program).

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for updating a page on a client, the method comprising:
receiving, at the client from a server, the page to be displayed to a user, the page having embedded therein delta page information associated with predetermined user input;
subsequent to the receiving of the page and the embedded delta page information at the client, and displaying the page to the user, performing the following steps without having to contact the server:
receiving, at the client user, input for the page that corresponds to the predetermined user input;
accessing the delta page information embedded in the page to determine update information corresponding to the predetermined user input; and
updating the page with a change included in the update information of the delta page information, the change corresponding to the predetermined user input and causing at least a portion of the page to be updated without having to contact the server using only the delta information embedded in the page.

2. The method of claim 1, wherein the delta page information is contained in a look-up table pursuant to an indexing scheme.

3. The method of claim 1, wherein the delta page information includes a control delta that represents changes in a control of the page as a result of the user input.

4. The method of claim 1, wherein the delta page information embodies preprocessed computations that are responsive to the user input.

5. The method of claim 1, wherein the updating step further comprises:
layering the delta page information that is associated with the user input into the page via Dynamic HTML.

6. The method of claim 1, wherein the updating step is performed by a process that is embedded in the page.

7. The method of claim 1, wherein the received delta page information is one of a plurality of portions of delta page information received on the client side, each of the portions of delta page information being configured to update the page.

8. The method of claim 1, wherein the user input is received using the page.

9. The method of claim 1, wherein the user input is used to select the delta page information from a plurality of portions of delta page information.

10. An information storage medium having a plurality of instructions for directing an information processing device to perform an operation for updating a page on a client, the operation comprising the steps of:
receiving, at the client from a server, the page to be displayed to a user, the page having embedded therein delta page information associated with predetermined user input;
subsequent to the receiving of the page and the embedded delta page information at the client, and displaying the page to the user, performing the following steps without having to contact the server:
receiving, at the client user, input for the page that corresponds to the predetermined user input;
accessing the delta page information embedded in the page to determine update information corresponding to the predetermined user input; and
updating the page with a change included in the update information of the delta page information, the change corresponding to the predetermined user input and causing at least a portion of the page to be updated without having to contact the server.

11. The information storage medium of claim 10, wherein the delta page information is contained in a look-up table pursuant to an indexing scheme.

12. The information storage medium of claim 10, wherein the delta page information includes a control delta that represents changes in a control of the page as a result of the user input.

13. The information storage medium of claim 10, wherein the delta page information embodies preprocessed computations that are responsive to the user input.

14. The information storage medium of claim 10, wherein the updating step further comprises:
layering the delta page information that is associated with the user input into the page via Dynamic HTML.

15. The information storage medium of claim 10, wherein the updating step is performed by a process that is embedded in the page.

16. The information storage medium of claim 10, wherein the received delta page information is one of a plurality of portions of delta page information, each of the portions of delta page information being configured for updating the page.

17. The information storage medium of claim 10, wherein the user input is received using the page.

18. The information storage medium of claim 10, wherein the user input is used to select the delta page information from a plurality of portions of delta page information.

19. A method for transmitting page information generated on a server to a client, the method comprising:
receiving a request at the server from the client for page information that is not available at the client;
generating a page that reflects the requested information;
embedding delta page information in the generated page, the delta page information representing differences between the generated page and a second page, the second page being configured for display on the client based on a predetermined user input, wherein the predetermined user input is responsive to the generated page; and
transmitting the generated page and the embedded delta page information to the client, wherein the delta page information allows the client to generate the second page, responsive to the predetermined user input, using the differences between the generated page and the second page included in the delta page information without having to contact the server after receiving the delta page information and the generated page.

20. The method of claim 19, wherein the associating step is performed as part of the generating step.

21. The method of claim 19, wherein the delta page information is contained in a look-up table and the associating step further comprises:
organizing the delta page information within the look-up table pursuant to an indexing scheme; and
embedding the look-up table in the page.

22. The method of claim 19, wherein the delta page information is indexed according to specific user inputs that can be provided from the page, each specific user input being related to a portion of the delta page information.

23. The method of claim 19, wherein the delta page information is comprised of a control delta that represents changes in a control of the page as a result of the user input.

24. The method of claim 19, wherein the delta page information embodies preprocessed computations that are responsive to the user input.

25. The method of claim 19 further comprising:
transmitting a process for updating the page with the delta page information to the client side from the server.

* * * * *

UNITED STATES PATENT AND TRADEMARK OFFICE
CERTIFICATE OF CORRECTION

PATENT NO.        : 7,406,514 B2
APPLICATION NO.   : 11/387193
DATED             : July 29, 2008
INVENTOR(S)       : Casalaina It is certified that error appears in the above-identified patent and that said Letters Patent is hereby corrected as shown below:

On the Title page, in Item (75), under "Inventors", in column 1, line 1, delete "C." and insert -- S. --, therefor.

On the Title page, in Item (56), under "Other Publications", in column 2, line 1, delete "in" and insert -- In --, therefor.

Title page Item (56) on page 2, in column 1, under "Other Publications", lines 1-3, above "Line 4" delete "Banga et al, "Optimistic Deltas for WWW Latency Reduction", In Proc. 1997 USENIX Technical Conf., pp. 289-303, Anaheim, CA, Jan. 1997."

In page 2, in Item (56), under "Other Publications", in column 1, line 4, delete "Questionaires" and insert -- Questionnaires --, therefor.

In page 2, in Item (56), under "Other Publications", in column 1, line 11, delete "Moblie" and insert -- Mobile --, therefor.

In page 2, in Item (56), under "Other Publications", in column 1, line 17, delete "ColdfFusion" and insert -- ColdFusion --, therefor.

In page 2, in Item (56), under "Other Publications", in column 1, line 26, delete "" http:" and insert -- "http: --, therefor.

In page 2, in Item (56), under "Other Publications", in column 1, line 26, delete "javascrpit" and insert -- javascript --, therefor.

In page 2, in Item (56), under "Other Publications", in column 2, line 3, after "intrabuilder" delete ".." and insert -- . --, therefor.

In page 2, in Item (56), under "Other Publications", in column 2, line 2, delete "javascrip- t" and insert -- javascript --, therefor.

In page 2, in Item (56), under "Other Publications", in column 2, line 29, delete "in.comp" and insert -- in comp --, therefor.

UNITED STATES PATENT AND TRADEMARK OFFICE
CERTIFICATE OF CORRECTION

PATENT NO. : 7,406,514 B2
APPLICATION NO. : 11/387193
DATED : July 29, 2008
INVENTOR(S) : Casalaina It is certified that error appears in the above-identified patent and that said Letters Patent is hereby corrected as shown below:

In page 2, in Item (56), under "Other Publications", in column 2, line 47, delete "Ian a.," and insert -- Ian A., --, therefor.

In page 2, in Item (56), under "Other Publications", in column 2, line 47, delete "Javascript" and insert -- JavaScript --, therefor.

In page 2, in Item (56), under "Other Publications", in column 2, line 50, delete "=&>." and insert -- =en&>. --, therefor.

In page 2, in Item (56), under "Other Publications", in column 2, line 63, delete "database" and insert -- databases --, therefor.

Signed and Sealed this

Twenty-second Day of December, 2009

David J. Kappos
*Director of the United States Patent and Trademark Office*